US012793473B1

(12) United States Patent
Andrzejewski et al.

(10) Patent No.: US 12,793,473 B1
(45) Date of Patent: Nov. 10, 2026

(54) MULTIMODAL PERCEPTION SIMULATION

(71) Applicant: Aurora Operations, Inc., Mountain View, CA (US)

(72) Inventors: Ivona Andrzejewski, Pittsburgh, PA (US); Steven Capell, Portland, OR (US); Ryusuke Villemin, San Francisco, CA (US); Carl Magnus Wrenninge, San Francisco, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 171 days.

(21) Appl. No.: 18/501,753

(22) Filed: Nov. 3, 2023

Related U.S. Application Data

(63) Continuation of application No. 18/172,912, filed on Feb. 22, 2023, now Pat. No. 11,847,869.

(51) Int. Cl.
*G07C 5/00* (2006.01)
*G06T 15/06* (2011.01)

(52) U.S. Cl.
CPC ............. *G07C 5/008* (2013.01); *G06T 15/06* (2013.01); *G06T 2210/21* (2013.01); *G06T 2210/61* (2013.01)

(58) Field of Classification Search
CPC ..... G07C 5/008; G06T 15/06; G06T 2210/21; G06T 2210/61
See application file for complete search history.

(56) References Cited

U.S. PATENT DOCUMENTS

2018/0077376 A1* 3/2018 Armeni ................... G06T 19/20
2018/0203445 A1 7/2018 Micks
2020/0210225 A1* 7/2020 Priyadarshi .......... G05D 1/0248
2020/0339109 A1 10/2020 Hong
2020/0353943 A1 11/2020 Siddiqui
(Continued)

FOREIGN PATENT DOCUMENTS

CN 110007279 A * 7/2019 ........... G01S 13/931
CN 111723243 A * 9/2020 ............. G06V 20/46
(Continued)

OTHER PUBLICATIONS

Thieling, Jom, Susanne Frese, and Jurgen Rossmann. "Scalable and physical radar sensor simulation for interacting digital twins." IEEE Sensors Journal 21.3 (2020): 3184-3192 (Year: 2020).
(Continued)

*Primary Examiner* — Said Broome
*Assistant Examiner* — Denis Vasiliy Minko
(74) *Attorney, Agent, or Firm* — Patent Law Works

(57) ABSTRACT

A concurrent simulation of multiple sensor modalities includes identifying the multiple sensor modalities in association with a simulation scenario, determining a timeline interleaving a publishing or operating frequency of each of the multiple sensor modalities relative to each other, determining a current time interval of a sliding window in the timeline, determining a simulation segment of the simulation scenario using the current time interval of the sliding window, rendering a scene based on the simulation segment, executing a simulation to concurrently simulate the multiple sensor modalities using ray tracing in the rendered scene, and generating simulated sensor data of the multiple sensor modalities based on executing the simulation.

20 Claims, 6 Drawing Sheets

(56) References Cited

U.S. PATENT DOCUMENTS

| | | | | |
|---|---|---|---|---|
| 2021/0286925 | A1* | 9/2021 | Wyrwas | G05D 1/0088 |
| 2021/0375028 | A1* | 12/2021 | Maneri | G06T 15/20 |
| 2021/0402302 | A1* | 12/2021 | Eads | A63F 13/5375 |
| 2022/0204009 | A1 | 6/2022 | Choi | |
| 2022/0204029 | A1* | 6/2022 | Chen | G01S 17/42 |
| 2022/0245312 | A1 | 8/2022 | Wyrwas | |
| 2022/0268939 | A1* | 8/2022 | Najmark | G06V 10/774 |
| 2022/0366640 | A1 | 11/2022 | Lasram | |

FOREIGN PATENT DOCUMENTS

| | | | | | |
|---|---|---|---|---|---|
| CN | 112102517 | A | * | 12/2020 | G07C 5/0841 |
| CN | 112907377 | A | * | 6/2021 | G06Q 40/03 |
| JP | 2020526353 | A | * | 8/2020 | A61B 5/02438 |
| KR | 20180011763 | A | * | 2/2018 | G01N 23/2202 |

OTHER PUBLICATIONS

International Search Report and Written Opinion, issued for PCT/US2023/083543, mailed on Apr. 2, 2024, 10 pgs.

Thieling et al. Scalable and Physical Radar Sensor Simulation for Interacting Digital Twins. IEEE Sensors Journal, vol. 21, No. 3, Sep. 24, 2020. Abstract only available.

Extended European Search Report issued for EP 23924456.9, mailed Mar. 3, 2026, 11 pgs.

* cited by examiner

MULTIMODAL PERCEPTION SIMULATION

CROSS-REFERENCE TO RELATED APPLICATIONS

This application is a continuation of U.S. patent application Ser. No. 18/172,912, filed Feb. 22, 2023, and entitled "Multimodal Perception Simulation," which is incorporated herein by reference in its entirety.

BACKGROUND

A significant part of autonomous vehicle technology is the use of simulations to validate the performance of the autonomous vehicle. In one example, the perception system of the autonomous vehicle is evaluated using simulated sensor data that it would otherwise get from its sensors to determine whether the perception system is making the right predictions about the world around it. However, the sensor data of multiple sensor modalities are simulated independent of each other. There exists a persistent need for a technique to simulate multiple sensor modalities in an efficient and effective manner.

SUMMARY

The present disclosure describes techniques for concurrently simulating multiple sensor modalities in association with virtual testing of an autonomous vehicle. An existing approach for simulating sensor data is to configure and execute a simulation for each sensor modality independent of one another. However, this approach is inefficient and time consuming as the scene to be simulated has to be rebuilt with different parameters for the simulation of each sensor modality. This scene rebuilding for the simulation of each sensor modality may also lead to inconsistencies in the representation of the same object in terms of simulated sensor data across the different sensor modalities. The present disclosure provides a unified scene representation to facilitate the concurrent simulation of multiple sensor modalities. The present disclosure is particularly advantageous for the concurrent simulation of multiple sensor modalities because an amount of scene information to render in the concurrent simulation is optimized and a database of multispectral material descriptions makes it efficient to manage the unified scene representation in the concurrent simulation across the different sensor modalities.

This specification relates to methods and systems for concurrently simulating multiple sensor modalities. According to one aspect of the subject matter described in this disclosure, a method includes identifying the multiple sensor modalities in association with a simulation scenario, determining a timeline interleaving a publishing frequency of each of the multiple sensor modalities relative to each other, determining a current time interval of a sliding window in the timeline, determining a simulation segment of the simulation scenario using the current time interval of the sliding window, rendering a scene based on the simulation segment, executing a simulation to concurrently simulate the multiple sensor modalities using ray tracing in the rendered scene and the current time interval of the sliding window, and generating simulated sensor data of the multiple sensor modalities based on executing the simulation.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform operations including identifying the multiple sensor modalities in association with a simulation scenario, determining a timeline interleaving a publishing frequency of each of the multiple sensor modalities relative to each other, determining a current time interval of a sliding window in the timeline, determining a simulation segment of the simulation scenario using the current time interval of the sliding window, rendering a scene based on the simulation segment, executing a simulation to concurrently simulate the multiple sensor modalities using ray tracing in the rendered scene and the current time interval of the sliding window, and generating simulated sensor data of the multiple sensor modalities based on executing the simulation.

Other implementations of one or more of these aspects include corresponding systems, apparatus, and computer programs, configured to perform the actions of the methods, encoded on computer storage devices.

These and other implementations may each optionally include one or more of the following aspects. For instance, the aspects may also include that determining the timeline interleaving the publishing frequency of each of the multiple sensor modalities relative to each other includes determining an order in which each of the multiple sensor modalities switch to perform their function relative to each other in time. For instance, the aspects may also include that determining the current time interval of the sliding window in the timeline includes identifying a sensor modality having a slowest publishing frequency among the multiple sensor modalities in the timeline, determining a time period between two consecutive publishing times of the sensor modality having the slowest publishing frequency in the timeline, determining the sliding window by setting the time period as a time interval of the sliding window, and tracking the current time interval of the sliding window in each advance of the sliding window in the timeline. For instance, the aspects may further include that tracking the current time interval of the sliding window in each advance of the sliding window in the timeline includes mapping each advance of the sliding window in the timeline to each simulation segment of a plurality of simulation segments in the simulation scenario. In another example, the aspects may further include that determining the simulation segment of the simulation scenario using the current time interval of the sliding window includes determining a total length of the simulation scenario, and determining a duration of the simulation segment in the simulation scenario that corresponds to the current time interval of the sliding window. In another example, the aspects may further include that the duration of the simulation segment is less than the total length of the simulation scenario. For instance, the aspects may also include that rendering the scene based on the simulation segment includes identifying a platform file corresponding to the simulation segment, converting the platform file to a three-dimensional (3D) scene description, and rendering the scene as a unified photorealistic scene based on 3D scene description. For instance, the aspects may include that the platform file defines one or more actor models, sensor models, and environment models. For instance, the aspects may further include that executing the simulation to concurrently simulate the multiple sensor modalities using ray tracing in the rendered scene and the current time interval of the sliding window includes tracing a ray from a simulator of each of the multiple sensor modalities through the rendered scene in the simulation based on the current time interval of the sliding window and providing a response to the simulator of each of the multiple sensor modalities based on an intersection between the ray and the rendered scene. For instance, the aspects may further include that providing the response to the simulator of each of the multiple sensor modalities based on the intersection between the ray and the rendered scene includes determining whether the ray hits an object in the rendered scene, identifying a material of the object and a wavelength of the ray responsive to determining that the ray hits the object in the rendered scene, accessing a database of multispectral material descriptions to look up a material description corresponding to the wavelength of the ray and the material of the object, and providing the response including material reflectance information to the simulator using the material description. For instance, the aspects may also include that generating the simulated sensor data of the multiple sensor modalities based on executing the simulation includes receiving a plurality of callback requests for the simulated sensor data of the multiple sensor modalities from an offline execution system, triggering a simulator for each of the multiple sensor modalities in the simulation of the rendered scene based on the plurality of callback requests, and sending the simulated sensor data of the multiple sensor modalities to the offline execution system. In another example, the aspects may include that the simulation scenario is a perception simulation scenario. In another example, the aspects may further include that the simulated sensor data includes one or more of LIDAR packets, RADAR frames, and camera images.

BRIEF DESCRIPTION OF THE DRAWINGS

These and other aspects and features of the present implementations will become apparent upon review of the following description of specific implementations in conjunction with the accompanying figures, wherein.

DETAILED DESCRIPTION

Overview

In the following disclosure, a multimodal sensor simulation system 166 is used to concurrently simulate multiple sensor modalities in association with virtual testing of an autonomous vehicle. The multimodal sensor simulation system 166 manages a timeline for facilitating an effective and concurrent simulation of multiple sensor modalities. The timeline may interleave an operating or publishing frequency of each of the multiple sensor modalities relative to each other in time. The timeline reveals the operating or publishing frequencies of multiple sensor modalities in the near future. The multimodal sensor simulation system 166 uses a sliding window in the timeline to optimize the amount of scene information from a simulation scenario to load into memory for rendering in the concurrent simulation of the multiple sensor modalities. For example, the multimodal sensor simulation system 166 may determine a plurality of simulation segments of a simulation scenario to load into memory for the concurrent simulation of multiple sensor modalities based on the sliding window. The present disclosure is particularly advantageous because loading a simulation segment into memory for the concurrent simulation of multiple sensor modalities ensures that the computational resource utilization (e.g., memory usage) is optimal and that the multiple sensor modalities are simulated efficiently in the right order based on their interleaved publishing frequencies in the timeline.

The multimodal sensor simulation system 166 uses a ray tracing framework to build a unified scene representation that is accessible to the simulators of different sensor modalities in the concurrent simulation to perform their sensor simulation. An existing approach for simulating sensor data is to configure and execute a simulation for each sensor modality independent of one another. In contrast, the multimodal sensor simulation system 166 executes a simulation to concurrently simulate the multiple sensor modalities based on the photorealistic scene representation and the current time interval of the sliding window. The multimodal sensor simulation system 166 determines whether a ray traced from a simulator hits an object within the scene representation in the simulation. The multimodal sensor simulation system 166 uses a database of multispectral material descriptions to switch between the material descriptions according to the wavelength of a ray traced from the simulator to the object. The present disclosure is particularly advantageous because the framework of multispectral material representation (or multiple wavelength material representation) facilitates concurrent simulation of multiple modalities by making it efficient to manage a unified scene representation across all the different sensor modalities and different sensor simulators that fire at different rates in the simulation of the unified scene representation.

Autonomous Vehicle

Figure 1:
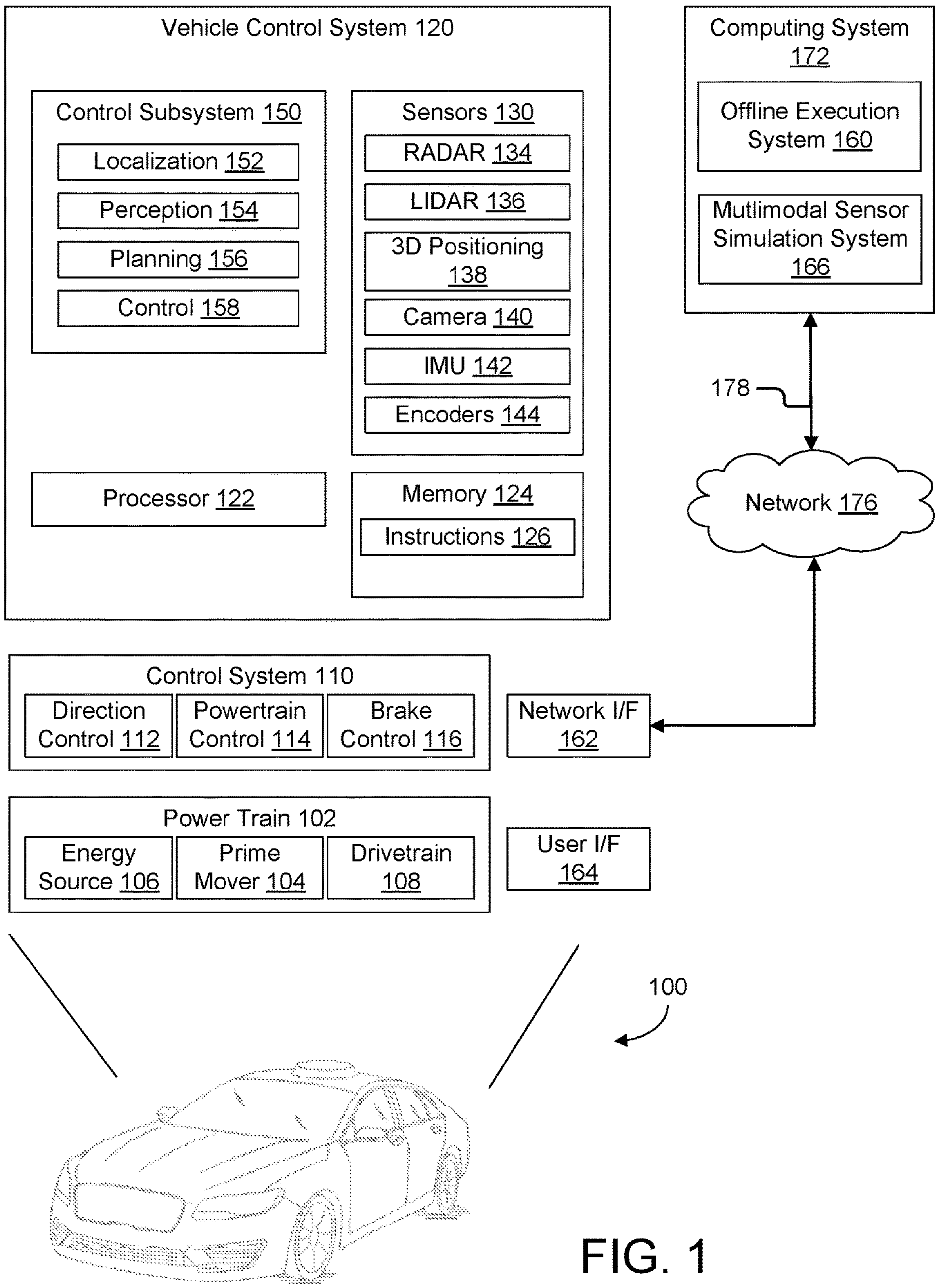
FIG. 1 is a block diagram illustrating an example hardware and software environment for an autonomous vehicle according to some implementations.

Referring to the drawings, wherein like numbers denote like parts throughout the several views, FIG. 1 illustrates an example hardware and software environment for an autonomous vehicle within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 may vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy sources, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some implementations, multiple electric motors (e.g., dedicated to individual wheels or axles) may be used as a prime mover. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle 100. For example, sensors 130 can include RADAR sensor 134, LIDAR (Light Detection and Ranging) sensor 136, a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose") of the vehicle 100 within its surrounding environment, and generally within some frame of reference. The perception subsystem 154 is principally responsible for detecting, tracking, and/or identifying objects within the environment surrounding the vehicle 100. A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

It will be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may be additional sensors beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random-access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network that includes a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing.

In the illustrated implementation, the vehicle 100 may communicate via the network 176 with a computing device or system 172 for the purposes of implementing various functions described below for concurrently simulating multiple sensor modalities in a unified perception simulation to be used in performance validation of an autonomous vehicle. In some implementations, computing system 172 is a cloud-based computing device. As described below in more detail with reference to FIG. 2, the computing device 172 includes an offline execution system 160 and a multimodal sensor simulation system 166. For example, in some implementations, the multimodal sensor simulation system 166 operates on the computing system 172 to identify multiple sensor modalities in association with a simulation scenario, determine a timeline interleaving an operating or publishing frequency of each of the multiple sensor modalities relative to each other, identify a current interval of time within the timeline sufficient for rendering, determine a segment of the simulation scenario corresponding to the current interval of time, rendering, using a collection of ray tracing kernels, a photorealistic scene representation based on the segment of the simulation scenario, executing a simulation of the photorealistic scene representation to concurrently simulate the multiple sensor modalities, and generate simulated sensor data of the multiple sensor modalities.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program codes described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Multimodal Sensor Simulation System

Figure 2:
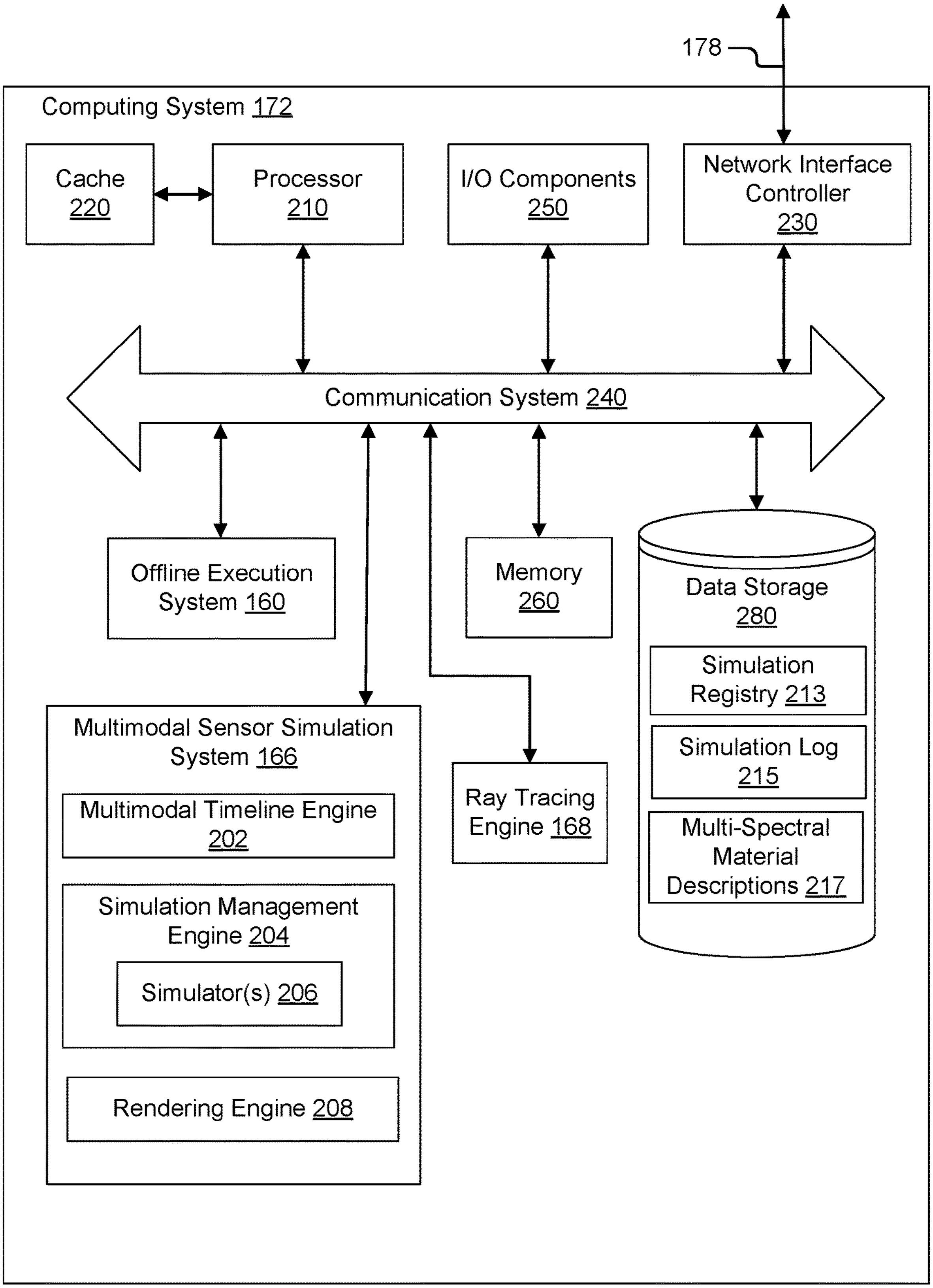
FIG. 2 is a block diagram illustrating an example computing system for concurrently simulating multiple sensor modalities in association with virtual testing of an autonomous vehicle according to some implementations.

FIG. 2 is a block diagram illustrating an example of a computing system 172 for concurrently simulating multiple sensor modalities in association with virtual testing of an autonomous vehicle according to some implementations.

Referring to FIG. 2, the illustrated example computing system 172 includes one or more processors 210 in communication, via a communication system 240 (e.g., bus), with memory 260, at least one network interface controller 230 with network interface port for connection to a network (e.g., network 176 via signal line 178), a data storage 280, and other components, e.g., an input/output ("I/O") components interface 250 connecting to a display (not illustrated) and an input device (not illustrated), an offline execution system 160, a multimodal sensor simulation system 166, and a ray tracing engine 168. Generally, the processor(s) 210 will execute instructions (or computer programs) received from memory 260. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The computing device 172 may be based on any processor, or set of processors, capable of operating as described herein. The processor(s) 210 may be a single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 260. While the offline execution system 160, the multimodal sensor simulation system 166, and ray tracing engine 168 are illustrated as being separate from processor 210 and memory 260, it will be appreciated that in some implementations, some or all of the functionality of the components 160, 166, and 168 may be implemented with program code instructions resident in the memory 260 and executed by the processor 210.

The cache memory 220 is generally a form of computer memory placed in close proximity to the processor(s) 210 for fast read times. In some implementations, the cache memory 220 is part of, or on the same chip as, the processor (s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processors 210. In some implementations, the network interface controller 230 is part of a processor 210. In some implementations, a computing system 172 has multiple network interfaces controlled by a single controller 230. In some implementations, a computing system 172 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, WiMAX, 5G, or any other wireless protocol). In some implementations, the network interface controller 230 implements one or more network protocols such as Ethernet. Generally, a computing device 172 exchanges data with other computing devices via physical or wireless links (represented by signal line 178) through a network interface. The network interface may link directly to another device or to another device via an intermediary device, e.g., a network device such as a hub, a bridge, a switch, or a router, connecting the computing system 172 to a data network such as the Internet.

The data storage 280 may be a non-transitory storage device that stores data for providing the functionality described herein. The data storage 280 may store, among other data, a simulation registry 213, a simulation log 215, and multi-spectral material descriptions 217, as will be defined below.

The computing system 172 may include, or provide interfaces for, one or more input or output ("I/O") devices 250. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers. Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing system 172 includes an additional device such as a co-processor, e.g., a math co-processor can assist the processor 210 with high precision or complex calculations.

In implementations consistent with the disclosure, the offline execution system 160 may be utilized to analyze and validate the performance of autonomous vehicle (AV) 100 through virtual testing. The offline execution system 160 facilitates virtual testing of the AV performance through simulated scenarios of autonomous driving. The offline execution system 160 may use the same programming framework and libraries as the existing hardware and software modules associated with the autonomous vehicle 100 to provide deterministic offline testing. In some implementations, the offline execution system 160 may provide a controlled execution environment for virtual testing of different subsystems of autonomous vehicle 100. For example, the offline execution system 160 may implement a virtual copy of the set of control subsystems 150 associated with the autonomous vehicle 100, such as the localization subsystem 152, the perception subsystem 154, the planning subsystem 156, and the control subsystem 158 in the controlled execution environment. The offline execution system 160 coordinates and handles message passing between the set of virtualized control subsystems 150 in a manner similar to the overall self-driving stack of the autonomous vehicle 100 in the real-world. This ensures that the autonomous system reacts in the same way to a simulated environment as it would in the real world.

In some implementations, the offline execution system 160 may interface and cooperate with the multimodal sensor simulation system 166 to simulate sensor data of multiple modalities to use in the validation of the autonomous vehicle 100 in the controlled execution environment. For example, the offline execution system 160 may send a plurality of callback requests to the multimodal sensor simulation system 166 for the simulated sensor data of multiple sensor modalities. The simulated sensor data of multiple sensor modalities may include, but are not limited to, LIDAR packets (e.g., point clouds from the LIDAR sensor), images (e.g. pixels of the camera), RADAR frames (e.g., returns from RADAR sensor), etc. The offline execution system 160 may feed the simulated sensor data to the set of virtualized control subsystems 150, such as to the virtualized perception subsystem 154 in the controlled execution environment. Using the simulated sensor data, the virtualized perception subsystem 154 may generate a set of predictions about what the autonomous vehicle 100 sees in the simulated environment around it. For example, the set of predictions may be that a first set of simulated sensor data corresponds to a parked car, a second set of simulated sensor data corresponds to a pedestrian, etc.

In implementations consistent with the disclosure, the multimodal sensor simulation system 166 is utilized to concurrently simulate multiple sensor modalities in association with virtual testing of an autonomous vehicle. More specifically, the multimodal sensor simulation system 166 is directed to generating simulated sensor data of multiple sensor modalities in an efficient manner by optimizing an amount of scene information that is loaded into memory for rendering in a simulation. In some implementations, the multimodal sensor simulation system 166 includes a multimodal timeline engine 202, a simulation management engine 204, and a rendering engine 208. In implementations consistent with the disclosure, the ray tracing engine 168 may implement a ray tracing framework consisting of a collection of high-performance ray tracing kernels. The ray tracing engine 168 is utilized to render a photorealistic scene representation (e.g., three dimensional (3D) scene) for the concurrent simulation of the multiple sensor modalities. The multimodal timeline engine 202, the simulation management engine 204, the rendering engine 208 of the multimodal sensor simulation system 166 and separately the offline execution system 160 and the ray tracing engine 168 are example components in which the techniques described herein may be implemented and/or with which systems, components, and techniques described herein may interface. While described in the context of the computing system 172, it should be understood that the operations performed by the one or more components 202, 204, 208, 160, and 168 of FIG. 2 may be distributed across multiple computing systems. In some implementations, one or more aspects of components 202, 204, 208, 160, and 166 may be combined into a single system and/or one or more aspects may be implemented by the computing system 172. For example, in some implementations, aspects of the simulation management engine 204 may be combined with aspects of the rendering engine 208. Engines in accordance with many implementations may each be implemented in one or more computing devices that communicate, for example, through the communication network 176.

The multimodal timeline engine 202 may be configured to manage a timeline for facilitating an effective and concurrent simulation of multiple sensor modalities. The multimodal timeline engine 202 identifies the different sensor modalities associated with a simulated operation of an autonomous vehicle 100 in a simulation scenario. For example, the different sensor modalities may include, but are not limited to, LIDAR, RADAR, ultrasonic, camera, 3D positioning, IMU, etc. The multimodal timeline engine 202 determines a publishing or operating frequency for each of the sensor modalities. The publishing frequency may be defined as the frequency at which a sensor module operates to perform its function (e.g., LIDAR emitting laser beams) or the frequency at which a sensor module publishes sensor data (e.g., for consumption and processing by control subsystems 150 in the vehicle control system 120) during an operation of the autonomous vehicle 100. For example, the multimodal timeline engine 202 may determine that the LIDAR sensor switches at a frequency of 250 hertz and a camera switches at a frequency of 20 hertz. The multimodal timeline engine 202 determines an order in which each of the multiple sensor modalities are switched or engaged relative to each other in the operation of the autonomous vehicle 100. For example, the multimodal timeline engine 202 may determine that the LIDAR sensor switches or fires a laser beam multiple times in between two consecutive images captured by the camera. For purposes of this disclosure, the terms "operating frequency" and "publishing frequency" of a sensor modality may be used interchangeably to generally mean the rate at which the sensor modality collects and/or publishes sensor data to facilitate autonomous vehicle operation.

Figure 4:
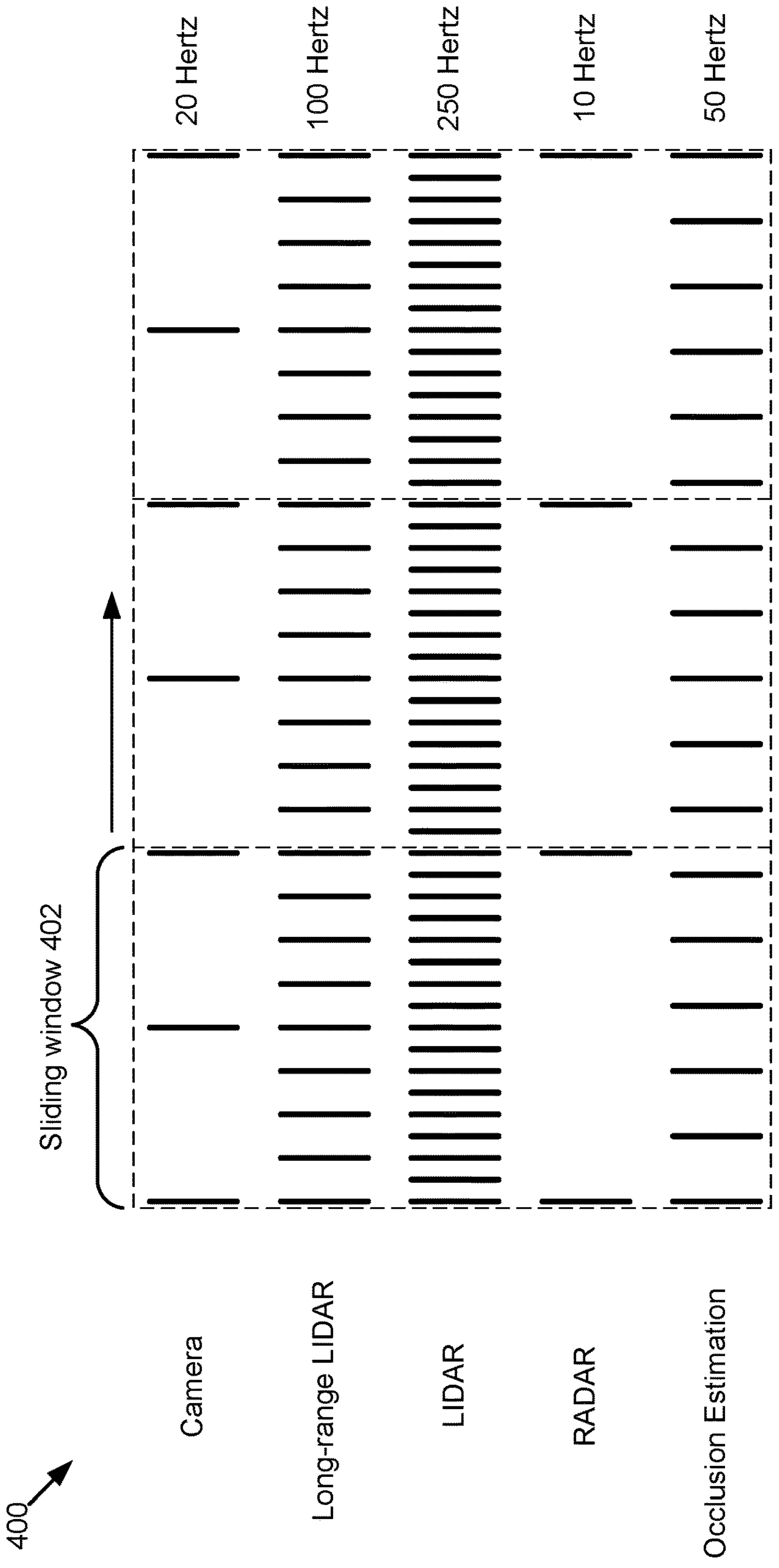
FIG. 4 is a timing diagram illustrating an example timeline corresponding to the multiple modalities according to some implementations.

The multimodal timeline engine 202 determines a timeline to manage the concurrent simulation of multiple sensor modalities based on the publishing frequency and the order in which each of the multiple sensor modalities are operated or publish sensor data. In some implementations, the multimodal timeline engine 202 interleaves the operating or publishing frequency of each of the multiple sensor modalities relative to each other in time to create the timeline. In some implementations, the multimodal timeline engine 202 may process a request to add a new modality to an existing timeline of multiple sensor modalities. In some implementations, the multimodal timeline engine 202 may support the inclusion of a non-sensor simulation task as a modality in the timeline. The non-senor modality may correspond to extracting useful information about one or more attributes from the scene representation rendered in the simulation. For example, the non-sensor modality may correspond to occlusion estimation of objects in the simulation. The occlusion estimation may be performed to determine an extent to which the objects, such as a car appear occluded to a sensor modality, such as RADAR in the simulation. In some implementations, such estimations may serve as ground-truth data. The multimodal timeline engine 202 determines a frequency at which the object occlusion is to be estimated from the simulation and interleaves the non-sensor modality with the other sensor modalities in the timeline. FIG. 4 illustrates a timing diagram 400 of an example timeline corresponding to the multiple modalities in accordance with some implementations. It will be appreciated that the timeline illustrated in FIG. 4 is merely exemplary in nature. Additionally or alternatively, in some implementations, multiple sensors of same modality may be included in the timeline. Likewise, different types and/or combinations of sensor modalities may be included in the timeline in other implementations. In the example of FIG. 4, the timeline depicts the camera publishing at a frequency of 20 hertz, the long-range LIDAR publishing at a frequency of 100 hertz, the LIDAR publishing at a frequency of 250 hertz, the RADAR publishing at a frequency of 10 hertz, occlusion estimation at a frequency of 50 hertz, etc. The black vertical bars in the timeline correspond to each instant when a corresponding sensor modality is switched and active in performing its function or publishing sensor data.

The timeline is informative in that it reveals the operating or publishing frequencies of multiple sensor modalities in the near future. The multimodal sensor simulation system 166 uses this feature of the timeline to optimize the amount of simulation scenario information to load into memory for rendering the concurrent simulation of the multiple sensor modalities. The multimodal timeline engine 202 determines a sliding window to advance in the timeline. In other words, the sliding window may be a simulation window of optimal time interval to use in a concurrent simulation of the multiple sensor modalities at a time. In some implementations, the multimodal timeline engine 202 identifies a sensor modality having a slowest operating or publishing frequency among the multiple sensor modalities in the timeline. The multimodal timeline engine 202 determines a time period between two consecutive operating or publishing times of the sensor modality identified as slowest in the timeline. The multimodal timeline engine 202 sets this time period as the optimal time interval for the sliding window. The multimodal timeline engine 202 tracks each slide or advance of the sliding window along the timeline, determines a current time interval of the sliding window in each advance of the sliding window, and forwards the current time interval to the simulation management engine 204 and/or the rendering engine 208. Each advance of the sliding window in the timeline may be mapped to each simulation segment of a plurality of simulation segments in the simulation scenario. Using the example timeline in FIG. 4, the multimodal timeline engine 202 identifies that RADAR has the slowest operating frequency at 10 hertz and sets the optimal time interval for the sliding window to coincide with the time period of RADAR. In FIG. 4, the multimodal timeline engine 202 advances the sliding window 402 to the right in the timeline after the current time interval is forwarded to the simulation management engine 204 and/or the rendering engine 208.

The simulation management engine 204 may access, process, and manage a base set of simulation scenarios that is sufficiently diverse to model a set of real-world situations with which the behavior of the autonomous vehicle 100 can be tested. A simulation scenario may describe a three-dimensional scene (e.g., a virtual scene) that simulates the behavior, properties, and sensor configuration of the autonomous vehicle in a specific encounter with the environment including other vehicles (autonomous and/or non-autonomous) at rest or in motion, pedestrians, time of day, weather conditions, terrain, and road surface markings, among other things. In some implementations, the simulation management engine 204 may access a base simulation scenario and convert the base simulation scenario into a plurality of simulation scenarios. For example, the simulation management engine 204 may use a parameter sweep to adjust a value of a parameter in a base simulation scenario through a defined range and generate configurations for a plurality of varying simulation scenarios. In another example, the simulation management engine 204 may use Monte Carlo sampling method for randomly sampling a value of a parameter in a base simulation from a probability distribution and generate configurations for a variety of simulation scenarios. As an example, changing the parameters in the base simulation scenario may include changing one or more configuration values of a vehicle platform parameter, a mapping parameter, a start gate, a start speed, actor (e.g., bicycle, pedestrian, etc.) placement, environmental parameter (e.g., road surface, curbs, sidewalks, etc.), or other autonomy parameters. In some implementations, the simulation management engine 204 may use vehicle logged data as a source of data that is based on ground truth about real world driving situations to adjust the parameter values in the base simulation scenario for generating the plurality of varying simulation scenarios. For example, in some implementations, the simulation management engine 204 uses vehicle logged data as an aid to generate a description including a behavior, vehicle configuration (e.g., autonomous vehicle location, platform, speed, or orientation), and sensor models or configuration of autonomous vehicle (e.g., ego vehicle) and the environment including actors (e.g., other vehicles, traffic, pedestrians, and static objects) in a simulation scenario. However, more generally, in some implementations, other information available from the vehicle logged data may be used as an aid in generating a simulation scenario. The vehicle logged data may be generally used, in some implementations, as a resource to provide a source of real sensor data for a simulation task that requires a source of real sensor data. In some implementations, the simulation management engine 204 may facilitate defining a modality that can be simulated in a simulation scenario and configure a simulator 206 for the defined modality. For example, the modality may include sensor and non-sensor modalities.

The simulation management engine 204 may register a simulation scenario by generating a simulation identifier, assigning the simulation identifier to the simulation scenario, and storing the simulation scenario in the simulation registry 213 indexed by the simulation identifier in the data storage 280. For example, the simulation identifier may be a globally unique identifier (GUID). The simulation registry 213 may be a database storing currently and previously available simulation scenarios indexed by their corresponding simulation identifiers. In some implementations, the simulation management engine 204 may process a simulation scenario and derive one or more tags to associate with the simulation scenario in the simulation registry 214. For example, the tag may be based on one or more of a geography (e.g., San Francisco, New York, etc.), actors (e.g., other vehicles, bicycles, pedestrians, mobility scooters, motorized scooters, etc.), behaviors (e.g., lane change, merge, steering, etc.), location (e.g., four-way stop, intersection, ramp, etc.), status (e.g., deprecated, quarantined, etc.), vehicle make and model, sensor configurations, etc. The simulation management engine 204 may also receive one or more user annotations for tagging each simulation scenario in the simulation registry 213. For example, the simulation management engine 204 provides a user interface for a user to tag all relevant actor, behavioral, environmental elements, etc. in a simulation scenario. The annotated tags make it easier to query the simulation registry 213 and select a simulation scenario. The simulation scenarios may also be categorized in the simulation registry 213 by the annotated tags. In some implementations, the simulation management engine 204 provides a user interface to query the simulation registry 213 for selecting one or more simulation scenarios to execute in a simulation. For example, the query may include one or more phrases, such as "pedestrians near the AV path," "speed limit=55mph," "4-way traffic light intersection," etc. The simulation management engine 204 matches the query with the annotated tags associated with the simulation scenarios and retrieves the matching simulation scenarios from the simulation registry 213.

In some implementations, the simulation management engine 204 may process, manage, and store a simulation scenario in the form of a platform file. A platform file of a simulation scenario may be implemented in different ways. The platform file may be a single file or a group of files, each storing a different type of data. In one example, the platform file includes vehicle model data describing information about vehicles, their sensor configuration, and other actor models in the simulation scenario, vehicle trajectory information (route or breadcrumbs for a path), environmental models (e.g., atlas, road surface, curb, sidewalk, cloudy day, rainy day, sunny day, dawn, dusk, etc.), calibration data for variables that require calibration to execute the simulation, simulation configuration data that specifies the configuration information for a simulation, and optionally a file management data file for general management functions. In some implementations, the calibration data calibrates an attribute of the ego-vehicle or an actor. The configuration data is used to configure different aspects of simulations. For example, a perception system simulation may require calibration data and configuration data for some aspects of the simulation of a particular perception system, such as its LIDAR system.

The simulation management engine 204 may execute a simulation for the set of control subsystems 150 of the autonomous vehicle 100 based on one or more simulation scenarios in the simulation registry 213. For example, the simulation scenarios may correspond to perception simulation scenarios, motion planning simulation scenarios, vehicle detection and tracking scenarios, etc. In some implementations, the simulation management engine 204 uses the simulation identifier to fetch a configuration of a matching simulation scenario from the simulation registry 213 and executes a simulation based on the fetched simulation scenario configuration. The simulation management engine 204 may create a run identifier (run ID) to associate with an execution (run) of the simulation. In some implementations, the simulation management engine 204 may create a batch of a plurality of simulation scenario variations and execute the batch in a single execution. In such implementations, the simulation management engine 204 may create a batch identifier (batch ID) to associate with the batch execution. The simulation management engine 204 may generate a simulation result and/or a simulation log during the execution of the simulation and store it in the simulation log 215. In some implementations, the simulation result and/or a simulation log may be one or more formatted messages including or encoded with state information of the autonomous vehicle 100 and other actors observed in the simulation. For example, the state information may include detection of events associated with the autonomous vehicle 100, such as simulated sensor data of multiple modalities observed in the simulation run. The simulation log 215 may be a database storing a historical log of simulation runs indexed by corresponding run ID and/or batch ID. In some implementations, the simulation management engine 204 generates one or more formatted messages reflecting events observed in the simulation scenario in real time during execution of the simulation for streaming to the offline execution system 160.

Existing approaches for simulating sensor data may require a simulation for each sensor modality to be performed separately. For example, a scene representation may be built for a camera and simulated for camera images. The same scene representation then needs to be rebuilt again with different parameters for LIDAR to simulate LIDAR frames. In contrast, the multimodal sensor simulation system 166 implements a concurrent simulation of multiple modalities. That is, the multimodal sensor simulation system 166 builds a unified scene representation that caters to all the sensor modalities that switch or publish at different rates in the simulation. The simulation management engine 204 accesses the simulation registry 213 and determines a simulation scenario for the concurrent simulation of multiple sensor modalities. For the purpose of concurrent simulation of multiple sensor modalities, the simulation management engine 204 may select a simulation scenario (e.g., perception simulation scenario) that specifies a predetermined motion and trajectory for the vehicles and includes one or more simulators 206 for sensor/non-sensor modalities. Each one of the simulators 206 may include appropriate models for sensor modalities, such as camera, RADAR, LIDAR, or any other perception-type sensor to simulate the perception of the world. In some implementations, a simulator 206 may be responsible for simulating a plurality of sensors of the same type. For example, the camera simulator 206 may be responsible for simulating 16 cameras. The camera simulator 206 may be equipped to simulate any one or all of the 16 cameras in a simulation. The simulators 206 may gather the relevant information from the simulation scenario during the simulation run. In some implementations, the simulation management engine 204 may receive a plurality of callback requests from the offline execution system 160 for simulated sensor data. The simulation management engine 204 may relay the plurality of callback requests into the simulation run of the simulation scenario to trigger one or more simulators 206 accordingly.

It may be computationally expensive to load the entire length of the simulation scenario into memory for the concurrent simulation of multiple sensor modalities. For example, the simulation scenario selected for the concurrent simulation of multiple sensor modalities may have a duration of 30 seconds. Furthermore, the simulation scenario may not be in a form that is directly usable by the simulators 206 for simulating their corresponding sensor data in the simulation. The simulation management engine 204 may determine a plurality of simulation segments of a simulation scenario to load into memory for the concurrent simulation of multiple sensor modalities. This manner of consuming a simulation scenario for concurrent simulation of multiple sensor modalities ensures that the computational resource utilization (e.g., memory usage) is optimal and that the multiple sensor modalities are simulated efficiently in a right order based on their interleaved operating or publishing frequencies in the timeline.

The simulation management engine 204 receives information including the current time interval of the sliding window in the timeline from the multimodal timeline engine 202. As described earlier, the current time interval of the sliding window reveals the interleaved operating or publishing frequencies of multiple sensor modalities in the near future. The simulation management engine 204 determines an appropriate amount of scene information in the simulation scenario to send to the rendering engine 208 for building a scene based on the current time interval of the sliding window. The simulation management engine 204 determines a simulation segment of the simulation scenario using the current time interval of the sliding window. The simulation management engine 204 determines a total length of the simulation scenario. The simulation management engine 204 determines a duration of a simulation segment in the simulation scenario that corresponds to the current time interval of the sliding window. The duration of the simulation segment is less than the total length of the simulation scenario. For example, the simulation management engine 204 may extract a simulation segment of length one second from the simulation scenario of length 30 seconds. In some implementations, the simulation management engine 204 may synchronize a beginning of the timeline to a beginning of the simulation scenario and determine successive simulation segments in the simulation scenario for each advance of the sliding window in the timeline. In other implementations, the simulation management engine 204 may determine a simulation segment from any location (e.g., beginning, middle, or end) in the simulation scenario that is yet to be processed for the concurrent simulation of multiple sensor modalities. The simulation management engine 204 may terminate a simulation when there are no simulation segments available to fetch from the corresponding simulation scenario. In some implementations, the simulation management engine 204 sends the simulation segment to the rendering engine 208 to render a unified scene representation that is usable by the simulators 206 of multiple modalities.

The rendering engine 208 serves the simulators 206 of multiple sensor modalities in the simulation with the data they need to perform their sensor simulation. For example, the rendering engine 208 renders a three dimensional scene representation using the functionality provided by the ray tracing engine 168 for concurrent simulation of multiple modalities. In some implementations, the rendering engine 208 serves as an application programming interface (API) layer to the ray tracing engine 168. The rendering engine 208 receives the simulation segment from the simulation management engine 204 and renders a scene based on the simulation segment using ray tracing. The rendering engine 208 converts the platform file corresponding to the simulation segment into a detailed 3D scene description. For example, the detailed 3D scene description may be in the form of a universal scene description (USD). The rendering engine 208 provides the detailed 3D scene description to the ray tracing engine 168. In some implementations, the rendering engine 208 synchronizes the detailed 3D scene description to the simulation through pose updates of the vehicle 100. The ray tracing engine 168 uses a collection of ray tracing kernels to render a photorealistic scene representation based on the detailed 3D scene description associated with the simulation segment. For example, the ray tracing engine 168 generates the photorealistic scene representation by performing ray tracing between the virtual objects within the scene and a virtual viewpoint of a sensor simulator 206. More specifically, the ray tracing engine 168 simulates a propagation of a ray and traces the ray from a sample point on a simulated sensor modality through the scene to a point of intersection within the scene. The ray tracing engine 168 speeds up the ray intersections by using ray tracing acceleration structures (e.g., bounding volume hierarchy (BVH), etc.) to build a representation of the scene's geometry or primitives using triangles and bounding volumes to quickly trace rays through the scene.

The rendering engine 208 queries the ray tracing engine 168 to pull data (e.g., in the form of a unified photorealistic scene representation) that is usable to the simulators 206 of multiple modalities for simulating their corresponding sensor data in the simulation. The rendering engine 208 cooperates with the simulation management engine 204 to execute a simulation to concurrently simulate the multiple sensor modalities based on the photorealistic scene representation and the current time interval of the sliding window. As described earlier, the current time interval of the sliding window reveals the interleaved operating or publishing frequencies of multiple sensor modalities in the near future. In the simulation run of the rendered scene, the simulators 206 simulate or generate the initial rays. The rendering engine 208 may trace the ray from a simulator 206 of each of the multiple sensor modalities through the rendered scene in the simulation based on their corresponding interleaved operating or publishing frequencies in the current time interval of the sliding window. The rendering engine 208 determines whether a ray traced from a simulator 206 hits an object within the scene representation in the simulation.

If there is a hit on an object, the rendering engine 208 identifies the material assigned to the object and the electromagnetic (EM) spectrum wavelength of the simulator 206 from which the ray is traced to the object. Different materials have different light-surface interaction characteristics, which may be referred to herein as reflectance characteristics. The reflectance characteristics of an object surface may vary based on, by way of example and not limitation, one or more of an angle of the object surface, the material of the object surface, a smoothness of the object surface, how much light penetrates the object surface, a color of the object surface, the wavelength of light used by the source, etc. The rendering engine 208 accesses a database of multispectral material descriptions 217 in the data storage 280 to determine a response to provide to the simulator 206 in the simulation. Each entry of a material (e.g., various car paints, painted metals, concrete, brick, asphalt, wood, plants, rock, leaves, glass, clothes, etc.) in the multispectral material descriptions 217 may include a material description corresponding to different EM spectrum wavelengths of sensor modalities, such as camera, LIDAR, RADAR, etc. In one example, the material description characterizing the material properties may be in form of bi-directional reflectance distribution function (BRDF) values that describe how light is scattered when striking the surface of the material.

The rendering engine 208 looks up the material description corresponding to the EM wavelength of the ray and the identified material of the object to send a response to the simulator 206. For example, the response provided to the simulator 206 may include general properties (e.g., identity of the object, color of the object, shape of the object, distance of the object, orientation of the object, surface normal, etc.), material properties (e.g., diffuse albedo, subsurface scatter, specular albedo, retroreflection, sheen, roughness, opacity, dullness, ambient occlusion, clear coat, emissive color, index of refraction, transmission, anisotropy, shininess, etc.), ground truth, etc. in association with the impacted object. For the same object in the unified scene representation, the rendering engine 208 switches between the material descriptions according to the EM spectrum wavelength of a ray traced from the simulators 206 of multiple sensor modalities. For example, a concrete material object in the scene representation which diffuses visible light in camera images may appear reflective specular on RADAR returns. The simulators 206 process the response from the rendering engine 208 during the execution of the simulation and generate the simulated sensor data of the multiple sensor modalities. This framework of multispectral material representation (or multiple wavelength material representation) facilitates concurrent simulation of multiple modalities by making it efficient to manage a unified scene representation across all the different sensor modalities and different sensor simulators that fire at different rates in the simulation of the unified scene representation.

Figure 3:
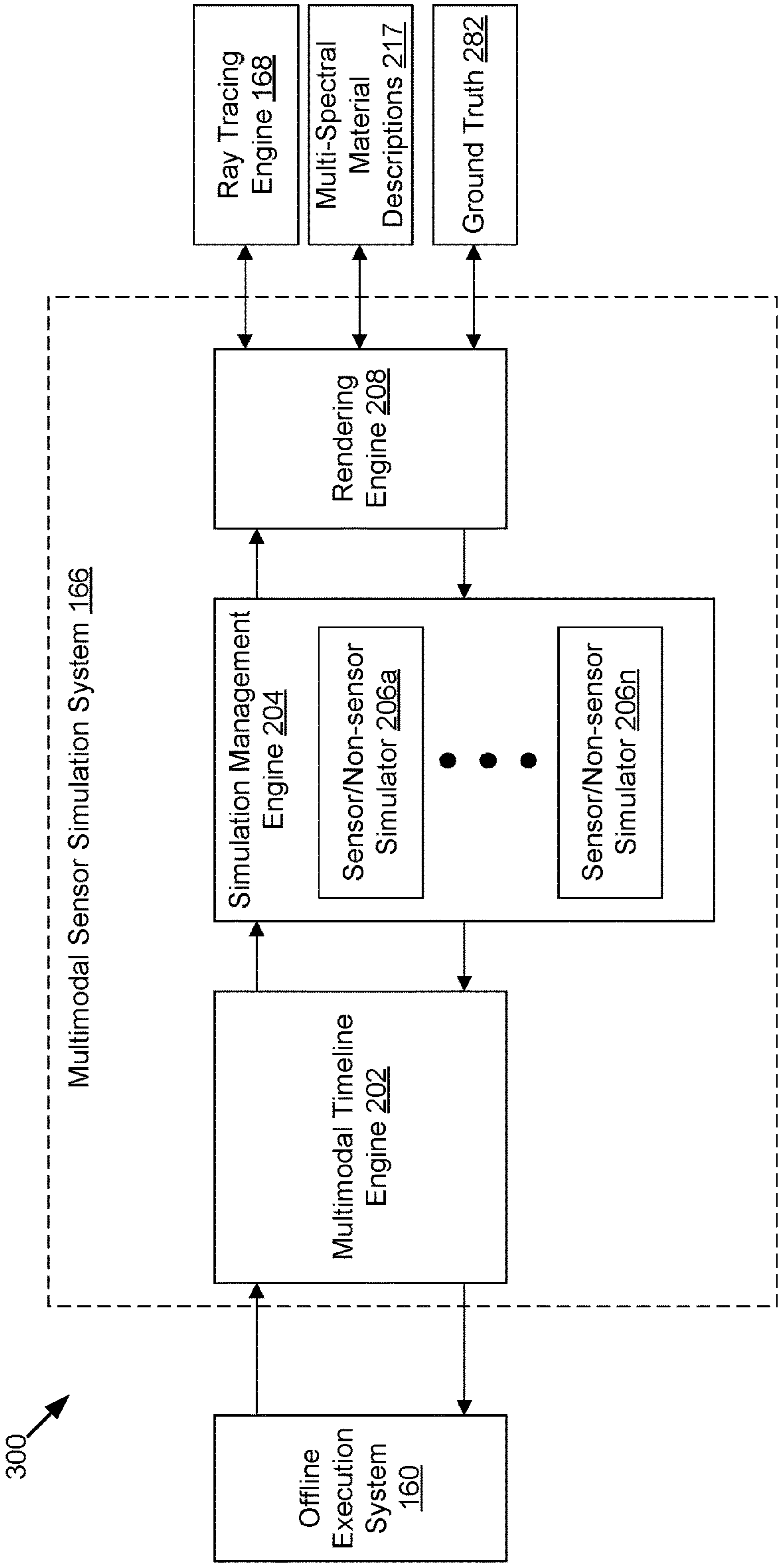
FIG. 3 is a block diagram illustrating an example implementation of a multimodal sensor simulation system referenced in FIG. 2.

Referring to the diagram 300 in FIG. 3, an example implementation of the multimodal sensor simulation system 166 is illustrated in greater detail. FIG. 3 shows a general data flow through the multimodal sensor simulation system 166 to concurrently simulate sensor data of multiple modalities. The offline execution system 160 sends a plurality of callback requests to the multimodal sensor simulation system 166 for the simulated sensor data of multiple modalities to use in the validation of the autonomous vehicle 100 in a controlled execution environment. The multimodal sensor simulation system 166 may include a multimodal timeline engine 202, a simulation management engine 204 defining a plurality of sensor/non-sensor simulators 206*a* . . . 206*n* in a simulation scenario, and a rendering engine 208.

In some implementations, the multimodal timeline engine 202 determines a timeline for facilitating an effective and concurrent simulation of multiple sensor modalities. For example, the multimodal timeline engine 202 may interleave the operating or publishing frequency of each of the multiple sensor modalities relative to each other in time to create the timeline. The multimodal timeline engine 202 uses the timeline to optimize the amount of scene information to load into memory for rendering in the concurrent simulation of the multiple modalities. The multimodal timeline engine 202 determines a sliding window to advance in the timeline such that a state of the scene to be simulated is optimized. The multimodal timeline engine 202 tracks a current time interval of the sliding window and provides it to the simulation management engine 204.

In some implementations, the simulation management engine 204 facilitates defining one or more modalities that can be simulated. The simulation management engine 204 accesses the simulation registry 213 in the data storage 280 and determines a simulation scenario for the concurrent simulation of multiple sensor modalities. The simulation scenario may include one or more simulators 206 for sensor/non-sensor modalities. Each one of the simulators 206 may include appropriate models for sensor modalities, such as camera, RADAR, LIDAR, or any other perception-type sensor to simulate the perception of the world. The simulation management engine 204 may send the plurality of callback requests into the simulation run of the simulation scenario to trigger one or more simulators 206. The simulation management engine 204 receives information including the current time interval of the sliding window in the timeline from the multimodal timeline engine 202. The simulation management engine 204 determines a simulation segment of the simulation scenario having a duration corresponding to the current time interval. The simulation management engine 204 sends the simulation segment of the simulation scenario to the rendering engine 208 to render a unified scene representation that is usable by the simulators 206 of multiple modalities.

The rendering engine 208 cooperates with the ray tracing engine 168 to serve the simulators 206 of multiple sensor modalities in the simulation with a render of a three dimensional unified scene representation. The ray tracing engine 168 uses a collection of ray tracing kernels to render a photorealistic scene representation based on the segment of the simulation scenario. The rendering engine 208 cooperates with the simulation management engine 204 to execute a simulation based on the photorealistic scene representation to concurrently simulate the multiple sensor modalities. The rendering engine 208 determines whether a ray traced from a sensor simulator 206 hits an object within the scene representation in the simulation. The rendering engine 208 accesses a database of multispectral material descriptions 217 in the data storage 280 to determine the material properties for the identified material of the object in the simulation of the scene. The rendering engine 208 looks up the material description matching the EM wavelength of the ray to send a response of the appropriate material properties to the sensor simulator 206. The rendering engine 208 looks up other data including ground truth 282 and pushes them to the non-sensor simulator 206 during the simulation. In some implementations, the simulation management engine 204 provides the simulated sensor data generated by the plurality of sensor/non-sensor simulators 206*a* . . . 206*n* to the multimodal timeline engine 202 and requests the multimodal timeline engine 202 for a current time interval of the sliding window along the timeline. The multimodal timeline engine 202 provides the simulated sensor data (e.g., camera images, LIDAR packets, RADAR frames, ground truth, etc.) to the offline execution system 160 in response to the plurality of callback requests.

Figure 5:
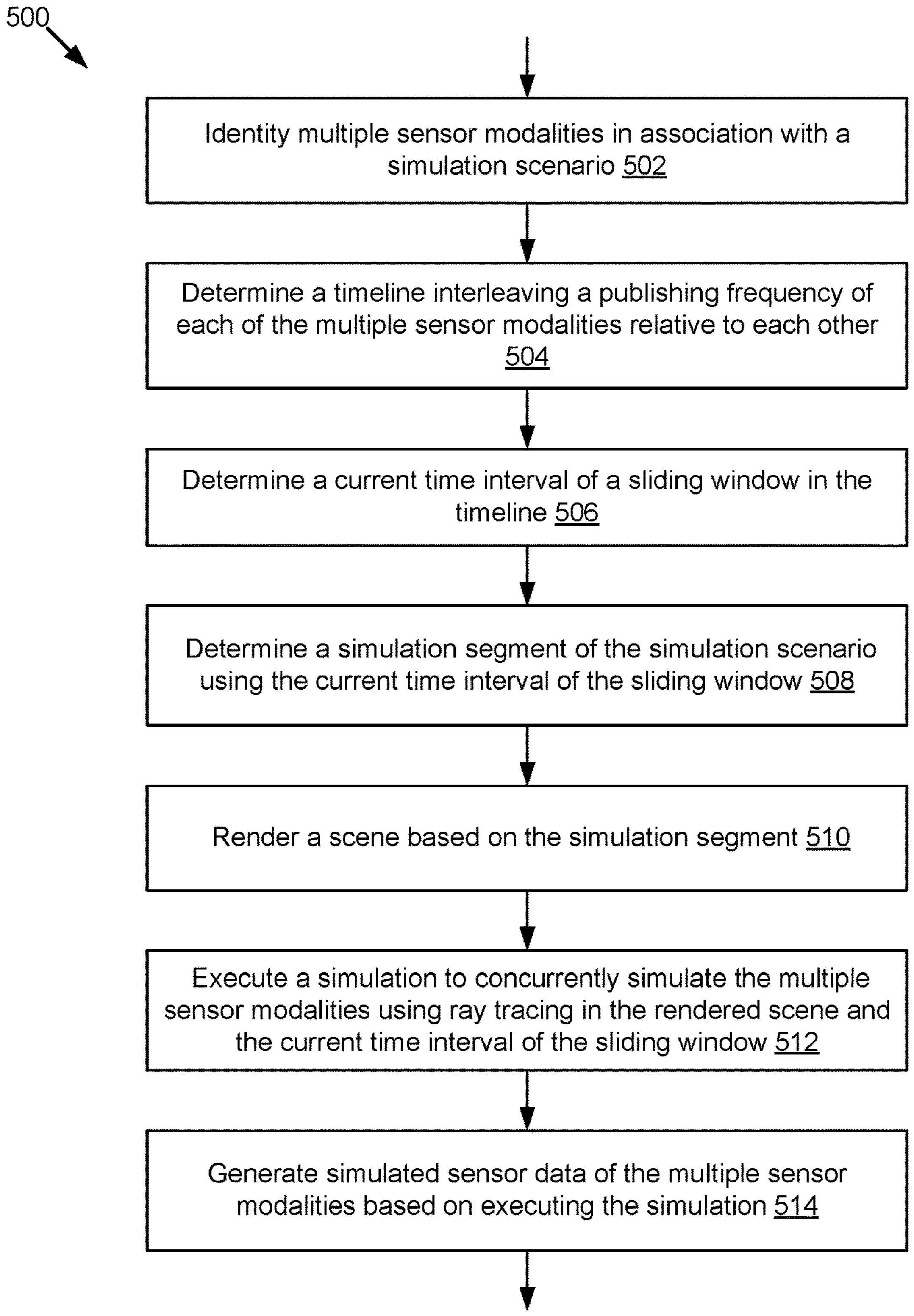
FIG. 5 is a flow chart illustrating an example method for concurrently simulating multiple sensor modalities according to some implementations.

Referring now to FIG. 5, a method 500 for concurrently simulating multiple sensor modalities in accordance with some implementations is illustrated. The method 500 may be a sequence of operations or process steps performed by a system of one or more computers in one or more locations, including, for example, the multimodal sensor simulation system 166 in the computing system 172 of FIG. 2, by another computer system that is separate from the multimodal sensor simulation system 166 in FIG. 2, or any combination thereof. Moreover, while in some implementations, the sequence of operations may be fully automated, in other implementations some steps may be performed and/or guided through human intervention. Furthermore, it will be appreciated that the order of operations in the sequence may be varied, and that some operations may be performed in parallel and/or iteratively in some implementations.

In block 502, the system identifies multiple sensor modalities in association with a simulation scenario. A simulation scenario may describe a three-dimensional scene (e.g., a virtual scene) that simulates the behavior, properties, and sensor configuration of the autonomous vehicle in a specific encounter with the environment including other vehicles (autonomous and/or non-autonomous) at rest or in motion, pedestrians, time of day, weather conditions, terrain, and road surface markings, among other things. The simulators 206 may simulate the sensor modalities on the autonomous vehicle, such as camera, RADAR, LIDAR, or any other perception-type sensor to simulate the perception of the world.

In block 504, the system determines a timeline interleaving a publishing frequency of each of the multiple sensor modalities relative to each other. The timeline reveals an ordering of the interleaved publishing frequencies of multiple sensor modalities in time. For example, the timeline may indicate that the LIDAR sensor switches or fires a laser beam multiple times in between two consecutive images captured by the camera.

In block 506, the system determines a current time interval of a sliding window in the timeline. The sliding window may be a simulation window of optimal time interval. The sliding window is configured to move along the timeline to identify segments of the simulation scenario to use in a concurrent simulation of the multiple sensor modalities at a time. In some implementations, the system identifies a sensor modality having a slowest publishing frequency among the multiple sensor modalities in the timeline, determines a time period between two consecutive publishing times of the sensor modality in the timeline, and sets the determined time period as the optimal time interval for the sliding window. The system tracks the current time interval of the sliding window in each advance of the sliding window in the timeline.

In block 508, the system determines a simulation segment of the simulation scenario using the current time interval of the sliding window. In some implementations, the system may determine a plurality of simulation segments of a simulation scenario to load into memory for the concurrent simulation of multiple sensor modalities. The duration of a simulation segment is less than the total length of the simulation scenario.

In block 510, the system renders a scene based on the simulation segment. In some implementations, the system identifies a platform file corresponding to the simulation segment, converts the platform file to a 3D scene description, and renders the scene as a unified photorealistic scene based on the 3D scene description. For example, the 3D scene description may be in the form of a universal scene description (USD).

In block 512, the system executes a simulation to concurrently simulate the multiple sensor modalities using ray tracing in the rendered scene and the current time interval of the sliding window. In some implementations, the system serves the simulators 206 of multiple sensor modalities in the simulation with the data they need to perform their sensor simulation. The system may trace a ray from a simulator 206 of each of the multiple sensor modalities through the rendered scene in the simulation based on their corresponding interleaved publishing frequencies in the current time interval of the sliding window.

In block 514, the system generates simulated sensor data of the multiple sensor modalities based on executing the simulation. For example, the simulated sensor data of multiple sensor modalities may include, but are not limited to, LIDAR packets (e.g., point clouds from the LIDAR sensor), images (e.g., pixels of the camera), RADAR frames (e.g., returns from RADAR sensor), etc.

Figure 6:
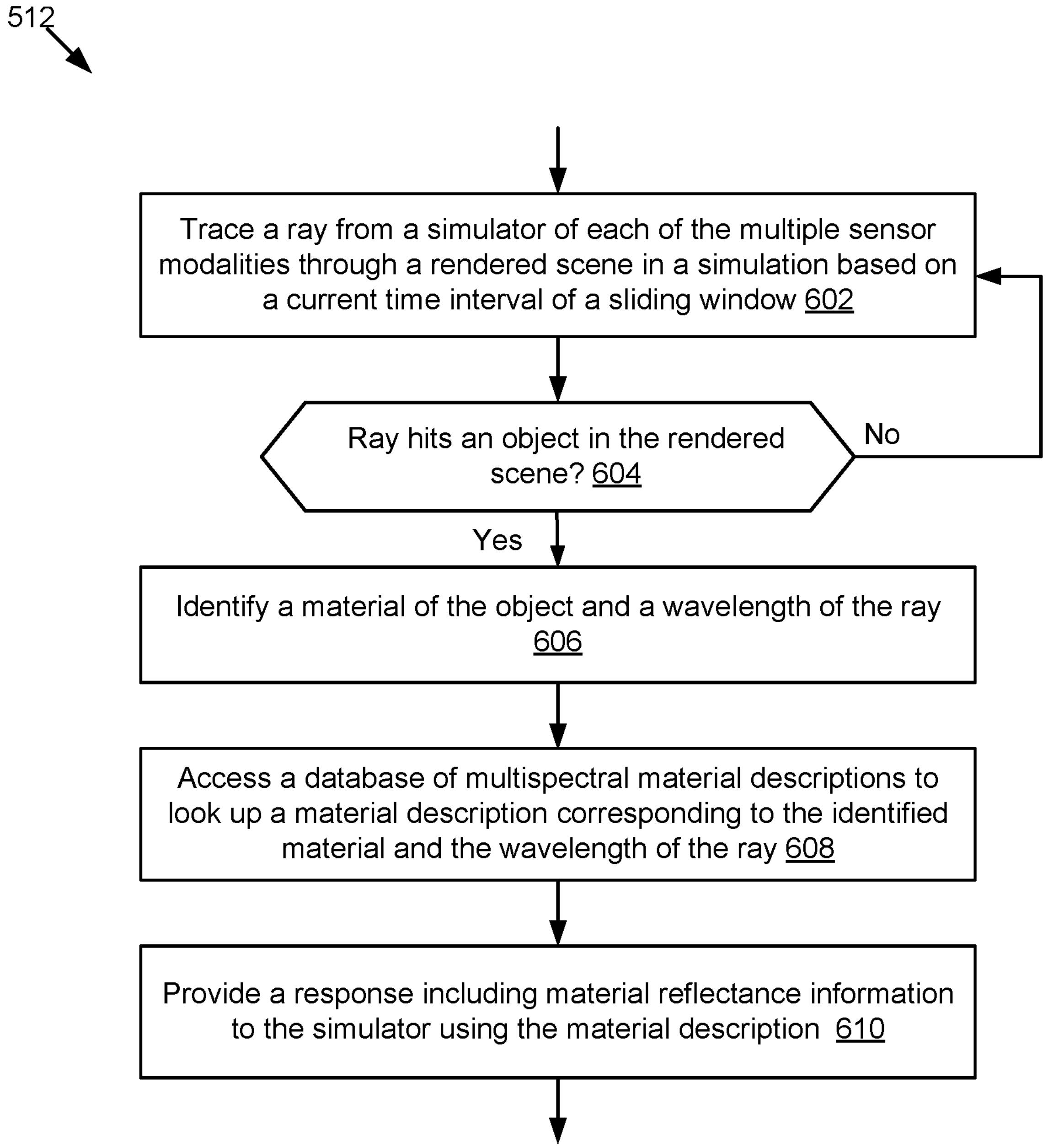
FIG. 6 is a flow chart illustrating an example method for executing a simulation to concurrently simulate the multiple sensor modalities according to some implementations.

Referring now to FIG. 6, a method 512 for executing a simulation to concurrently simulate the multiple sensor modalities in accordance with some implementations is illustrated. The method 512 may be a sequence of operations or process steps performed by a system of one or more computers in one or more locations, including, for example, the multimodal sensor simulation system 166 in the computing system 172 of FIG. 2, by another computer system that is separate from the multimodal sensor simulation system 166 in FIG. 2, or any combination thereof.

In block 602, the system traces a ray from a simulator 206 of each of the multiple sensor modalities through a rendered scene in a simulation based on a current time interval of the sliding window. The rendered scene may be a photorealistic scene representation that the simulator 206 of each of the multiple sensor modalities need to perform their sensor simulation. As noted above, the current time interval of the sliding window reveals the interleaved publishing frequencies of multiple sensor modalities in the near future. The system may trace a ray from a simulator 206 of each of the multiple sensor modalities through the rendered scene in the simulation based on their corresponding interleaved publishing frequencies in the current time interval of the sliding window.

In block 604, the system determines whether the traced ray hits an object in the rendered scene.

If in block 604, the system determines that the traced ray did not hit an object in the rendered scene, then the system proceeds to block 602. The system continues to trace a ray from a simulator 206 of each of the multiple sensor modalities through a rendered scene in the simulation.

On the other hand, if in block 604, the system determines that the traced ray hits an object in the rendered scene, then the system proceeds to block 606.

In block 606, the system identifies a material of the object and a wavelength of the ray. The wavelength of a ray traced from a simulator 206 of LIDAR differs from a ray traced from a simulator 206 of RADAR. The material of the object may have a different material reflectance characteristics depending on the wavelength of the ray impacting it in the simulation.

In block 608, the system accesses a database of multispectral material descriptions to look up a material description corresponding to the identified material and the wavelength of the ray. In one example, the database of multispectral material descriptions includes a visible light wavelength material description, an infrared wavelength material description, and a radio wavelength material description for each material. For the same material object in the unified scene representation, the system switches between the material descriptions according to the wavelength of a ray traced from the simulators 206 of multiple sensor modalities.

In block 610, the system provides a response including material reflectance information to the simulator 206 using the material description. For example, the response provided to the simulator 206 may include general properties (e.g., identity of the object, color of the object, shape of the object, distance of the object, orientation of the object, surface normal, etc.), material properties (e.g., diffuse albedo, subsurface scatter, specular albedo, retroreflection, sheen, roughness, opacity, dullness, ambient occlusion, clear coat, emissive color, index of refraction, transmission, anisotropy, shininess, etc.), ground truth, etc. in association with the impacted object.

The previous description is provided to enable practice of the various aspects described herein. Various modifications to these aspects will be understood, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable others to make or use the disclosed subject matter. Various modifications to these implementations will be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples will be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for concurrently simulating multiple sensor modalities, the method comprising:

identifying the multiple sensor modalities in association with a simulation scenario;

determining a timeline that interleaves one or more publishing events for each of the multiple sensor modalities based on a respective publishing frequency of each of the multiple sensor modalities;

determining a current time interval of a sliding window within the timeline;

determining a simulation segment of the simulation scenario using the current time interval of the sliding window;

rendering a scene based on the simulation segment;

executing a simulation of the multiple sensor modalities using ray tracing within the rendered scene in accordance with the one or more publishing events during the current time interval of the sliding window; and generating simulated sensor data for the multiple sensor modalities corresponding to the one or more publishing events based on the simulation.

2. The method of claim 1, wherein determining the timeline that interleaves one or more publishing events for each of the multiple sensor modalities comprises determining an order in which each of the multiple sensor modalities switch to perform their function relative to each other in time.

3. The method of claim 1, wherein determining the current time interval of the sliding window within the timeline comprises:

identifying a sensor modality having a longest interval between two consecutive publishing times among the multiple sensor modalities in the timeline;

determining a time period between the two consecutive publishing times of the sensor modality in the timeline; and determining the sliding window by setting the time period as the current time interval of the sliding window.

4. The method of claim 1, further comprising:

tracking the current time interval of the sliding window in each advance of the sliding window across the timeline; and mapping each advance of the sliding window across the timeline to each simulation segment of a plurality of simulation segments in the simulation scenario.

5. The method of claim 4, wherein determining the simulation segment of the simulation scenario using the current time interval of the sliding window comprises:

determining a total length of the simulation scenario; and determining a duration of the simulation segment in the simulation scenario that corresponds to the current time interval of the sliding window, wherein the duration of the simulation segment is less than the total length of the simulation scenario.

6. The method of claim 1, wherein rendering the scene based on the simulation segment comprises:

identifying a platform file corresponding to the simulation segment;

converting the platform file to a three-dimensional (3D) scene description; and rendering the scene as a unified photorealistic scene based on 3D scene description.

7. The method of claim 6, wherein the platform file defines one or more actor models, sensor models, and environment models.

8. The method of claim 1, wherein executing the simulation the of the multiple sensor modalities using ray tracing within the rendered scene in accordance with the one or more publishing events during the current time interval of the sliding window comprises:

tracing a ray from a simulator of each of the multiple sensor modalities through the rendered scene in the simulation in accordance with the one or more publishing events during the current time interval of the sliding window; and providing a response to the simulator of each of the multiple sensor modalities based on an intersection between the ray and the rendered scene.

9. The method of claim 8, wherein providing the response to the simulator of each of the multiple sensor modalities based on the intersection between the ray and the rendered scene further comprises:

determining whether the ray hits an object in the rendered scene;

responsive to determining that the ray hits the object in the rendered scene, identifying a material of the object and a wavelength of the ray;

accessing a database of multispectral material descriptions to look up a material description corresponding to the wavelength of the ray and the material of the object; and providing the response including material reflectance information to the simulator using the material description.

10. The method of claim 1, wherein generating the simulated sensor data for the multiple sensor modalities corresponding to the one or more publishing events based on the simulation further comprises:

receiving a plurality of callback requests for the simulated sensor data of the multiple sensor modalities from an offline execution system;

triggering a simulator for each of the multiple sensor modalities in the simulation of the rendered scene based on the plurality of callback requests; and sending the simulated sensor data of the multiple sensor modalities to the offline execution system.

11. The method of claim 1, wherein the simulation scenario is a perception simulation scenario.

12. The method of claim 1, wherein the simulated sensor data includes one or more of LIDAR packets, RADAR frames, and camera images.

13. A system comprising one or more processors and memory operably coupled with the one or more processors, wherein the memory stores instructions that, in response to execution of the instructions by one or more processors, cause the one or more processors to perform operations including:

identifying multiple sensor modalities in association with a simulation scenario;

determining a timeline that interleaves one or more publishing events for each of the multiple sensor modalities based on a respective publishing frequency of each of the multiple sensor modalities;

determining a current time interval of a sliding window within the timeline;

determining a simulation segment of the simulation scenario using the current time interval of the sliding window;

rendering a scene based on the simulation segment;

executing a simulation of the multiple sensor modalities using ray tracing within the rendered scene in accordance with the one or more publishing events during the current time interval of the sliding window; and generating simulated sensor data for the multiple sensor modalities corresponding to the one or more publishing events based on the simulation.

14. The system of claim 13, wherein determining the timeline that interleaves one or more publishing events for each of the multiple sensor modalities comprises determining an order in which each of the multiple sensor modalities switch to perform their function relative to each other in time.

15. The system of claim 13, wherein determining the current time interval of the sliding window within the timeline comprises:

identifying a sensor modality having a longest interval between two consecutive publishing times among the multiple sensor modalities in the timeline;

determining a time period between the two consecutive publishing times of the sensor modality in the timeline; and determining the sliding window by setting the time period as the current time interval of the sliding window.

16. The system of claim 13, further comprising:

tracking the current time interval of the sliding window across each advance of the sliding window; and mapping each advance of the sliding window across the timeline to each simulation segment of a plurality of simulation segments in the simulation scenario.

17. The system of claim 16, wherein determining the simulation segment of the simulation scenario using the current time interval of the sliding window comprises:

determining a total length of the simulation scenario; and determining a duration of the simulation segment in the simulation scenario that corresponds to the current time interval of the sliding window, wherein the duration of the simulation segment is less than the total length of the simulation scenario.

18. The system of claim 13, wherein rendering the scene based on the simulation segment comprises:

identifying a platform file corresponding to the simulation segment;

converting the platform file to a three-dimensional (3D) scene description; and rendering the scene as a unified photorealistic scene based on 3D scene description.

19. The system of claim 13, wherein executing the simulation of the multiple sensor modalities using ray tracing within the rendered scene in accordance with the one or more publishing events during the current time interval of the sliding window comprises:

tracing a ray from a simulator for each of the multiple sensor modalities through the rendered scene in the simulation in accordance with the one or more publishing events during the current time interval of the sliding window; and providing a response to the simulator of each of the multiple sensor modalities based on an intersection between the ray and the rendered scene.

20. The system of claim 19, wherein providing the response to the simulator of each of the multiple sensor modalities based on the intersection between the ray and the rendered scene further comprises:

determining whether the ray hits an object in the rendered scene;

responsive to determining that the ray hits the object in the rendered scene, identifying a material of the object and a wavelength of the ray;

accessing a database of multispectral material descriptions to look up a material description corresponding to the wavelength of the ray and the material of the object; and providing the response including material reflectance information to the simulator using the material description.

* * * * *